(12) United States Patent
Venham et al.

(10) Patent No.: US 6,927,297 B2
(45) Date of Patent: Aug. 9, 2005

(54) REDUCTION OF MONOMER CONTENT AND STABILIZATION OF POLYAZIRIDINES

(75) Inventors: Lanny D. Venham, Oakdale, PA (US); Douglas A. Wicks, Hattiesburg, MS (US); Karsten Danielmeier, Bethel Park, PA (US); Joseph P. Mandara, Barnegat, NJ (US)

(73) Assignee: Bayer MaterialScience LLC, Pittsburgh, PA (US)

(*) Notice: Subject to any disclaimer, the term of this patent is extended or adjusted under 35 U.S.C. 154(b) by 246 days.

(21) Appl. No.: 10/285,657

(22) Filed: Oct. 31, 2002

(65) Prior Publication Data

US 2004/0087763 A1 May 6, 2004

(51) Int. Cl.$^7$ .............................................. C07D 203/04
(52) U.S. Cl. ...................................... 548/954; 524/430
(58) Field of Search ................................ 548/954, 962; 524/430

(56) References Cited

U.S. PATENT DOCUMENTS

| | | | | |
|---|---|---|---|---|
| 2,596,299 | A | 5/1952 | Simpson | 23/288 |
| 4,025,503 | A | 5/1977 | Miksovsky et al. | 260/239 |
| 4,563,307 | A * | 1/1986 | Briden | 548/964 |
| 5,981,267 | A | 11/1999 | Wong et al. | 435/280 |
| 6,667,407 | B2 * | 12/2003 | Venham et al. | 548/962 |

OTHER PUBLICATIONS

U.S. Appl. No. 10/137,805, "A Process of Making Polyaziridines" (Mo–7185 MD–01–122–LS).
Tetrahedron Letters, vol. 24, No. 39, (month unavailable) 1983, pp. 4197–4198, Romuald Bartnik, Zofia Cebulska, et André Laurent, "Synthese Photochimiques D'aza–1 Bicyclobutanes".
J. Org. Chem. 59, (26, (month unavailable) 1994, pp. 7962–7967, Frederick E. Ziegler and Makonen Benema, "Cyclization of Chiral Carbon–Centered Aziridinyl Radicals: A New Route to Azirino[2',3,4]pyrrolor[1,2–a]indoles".
Makromol. Chem., Rapid Commun. 9, (month unavailable) 1998, Ryoki kNomura, Masakuni Kori, Haruo Matsuda, "Copolymerization of cyclic imines and cyclic carbonates in the presence of triethylamine, –phosphine or –stibine".

* cited by examiner

Primary Examiner—Kamal A. Saeed
Assistant Examiner—Robert Shiao
(74) Attorney, Agent, or Firm—Joseph C. Gil; Thomas W. Roy

(57) ABSTRACT

The invention relates to a process for reducing the monomeric aziridine content in a polyaziridine forming reaction mixture by adding to the polyaziridine forming reaction mixture an excess of an organic carbonate scavenger wherein the excess is based on the equivalent ratio of scavenger to monomeric aziridine, and to a product obtained by this process and to a coating composition containing the product obtained by the process.

17 Claims, No Drawings

REDUCTION OF MONOMER CONTENT AND STABILIZATION OF POLYAZIRIDINES

BACKGROUND OF THE INVENTION

The invention relates to a process for reducing monomeric aziridines in a polyaziridine reaction by adding organic carbonates as a scavenger, the products obtained by that process and coating compositions prepared from these products.

Polyfunctional aziridines have been shown to be useful as crosslinking agents in various types of waterborne and solventborne coating systems such as carboxylated acrylics, vinyl-acetate, carboxylated urethanes such as polyurethane dispersions (PUDs), styrene acrylics or mixtures thereof.

One important subclass of commercially available polyfunctional aziridines includes reaction products of ethylene imine (EI, aziridine) or propylene imine (PI, methyl aziridine) with trimethylol propane triacrylate (described for example in U.S. Pat. No. 2,596,299 to Bastian). Other commercially important polyfunctional aziridines can be prepared from ethylene imine or propylene imine and pentaerythritol triacrylate. Other polyfunctional aziridines are based on alkoxylated polyols.

Another method of preparing polyfunctional aziridines includes the transesterification of methyl (1-aziridinyl) propionates with polyols catalyzed with tertiary amines (as described in DE 2334656 to Miksovsky), whereby the methyl (1-aziridinyl)propionates are prepared from monomeric aziridines.

Ethylene imine and propylene imine are volatile low molecular weight toxic compounds which are undesired residuals in the processes to form polyfunctional aziridines. The residual monomeric aziridine compound has to be removed sometimes tediously by elaborate distillation methods or lengthy aging processes. This is especially true, if the reaction temperature is low, which is sometimes necessary to avoid discoloration or viscosity problems. Sometimes the residue can exceed 1000 ppm in crude reaction mixtures. It is very desirable to reduce this amount for a commercial product below 500 ppm and even more preferred to reduce it below 100 ppm or ultimately below 10 ppm.

To drive the Michael-type addition reaction of the aziridine and the acrylate to completion, it is possible to use an excess of aziridine. A disadvantage of this approach is the amount of aziridine to be removed from the reaction product under vacuum. With a simple distillation column and a vacuum of about 50 mm Hg it is usually not possible to remove the aziridine level to below 300 ppm on a commercial time scale, for example in a day. To achieve an aziridine level below that, it is necessary to use refined equipment, like an expensive falling-film or wiping-film evaporator, or longer distillation times which is economically unfavorable. Another method to drive the Michael addition uses an excess of acrylate. The residual aziridine levels can thereby be reduced to less than 10 ppm, which sometimes require considerable aging times up to several months, which again is economically unfavorable.

It is an object of the present invention to provide an easy process for making polyfunctional aziridines without advanced and expensive distillation or cleaning steps. It is another object of the invention to produce polyfunctional polyaziridines that are rheologically stable and are low in color. It is another object of the invention to develop a process that results in less than 10 ppm of monomeric aziridine without incurring elaborate vacuum steps or long batch or aging times The present invention uses a scavenger. The reactions between electrophiles and aziridines have been described in detail in the literature. Copending application Ser. No. 10/137,805 uses isocyanates as scavengers. One example of a suitable electrophile is an organic carbonate.

The reaction between aziridines and organic carbonates is described. Nomura et al. describe the copolymerization of aziridine or 2 methylaziridine and 1,3-dioxolan-2-one or 4-methyl-1,3-dioxolan-2-one resulting in alternating copolymers without the formation of polyaziridines in Makromol. Chem., Rapid Comm 1988, 9(11), 739.

U.S. Pat. No. 5,981,267 to Wong et al. describes the reaction of an aziridine with diallylcarbonate under the influence of a lipase.

Other authors describe various applications in which aziridines are reacted with carbonates where those are being used as protective groups. Examples of those include DE 19512207 to Jaehnisch and J. Org. Chem. 59(26), 7962, 1994.

Tetrahedron Lett. 24(39), 4197, 1983 uses the intramolecular reaction between an aziridine and a carbonate to form oxazolidinon derivatives.

None of the above disclosures however describes the present invention.

SUMMARY OF THE INVENTION

The invention relates to a process for reducing monomeric aziridines in a polyaziridine forming reaction mixture by adding to the polyaziridine forming reaction mixture an excess of an organic carbonate as scavenger, wherein the excess is based on the equivalent ratio of scavenger to monomeric aziridine.

The invention also relates to the product obtained by this process and a coating composition containing this product.

DETAILED DESCRIPTION OF THE INVENTION

Various aziridines and substituted aziridines can be used to form polyfunctional aziridines. The suitable aziridines are well known in the art and generally correspond to the formula

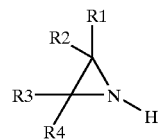

where $R_1$, $R_2$, $R_3$, and $R_4$ independently represent hydrogen; alkyl with up to about 20 carbon atoms, preferably methyl, ethyl, or propyl; aryl, preferably phenyl; alkaryl, preferably tolyl or xylyl; or aralkyl, preferably benzyl or phenethyl.

The groups $R_1$–$R_4$ may represent substituted radicals wherein the substituents include cyano, halo, amino, hydroxy, alkoxy, carbalkoxy, and nitrile. Suitable examples of substituted groups $R_1$, $R_2$, $R_3$, and $R_4$ thus include cyanoalkyl, haloalkyl, aminoalkyl, hydroxyalkyl alkoxyalkyl, carbalkoxyalkyl, and similar substituted derivatives of aryl, alkaryl and aralkyl groups.

Specific examples of suitable aziridines include ethylenimine (aziridine), 1,2-propylenimine (2-methyl aziridine), 2-ethyl aziridine, 1,2-dodecylenimine (2-decyl aziridine), 1,1-dimethyl ethylenimine (2,2-dimethyl aziridine), phenyl ethylenimine (2-phenyl aziridine), tolyl ethylenimine (2-(4-methylphenyl) aziridine), benzyl ethylenimine (2-phenylmethyl aziridine), 1,2-diphenyl ethylenimine (2,3-diphenyl aziridine), hydroxyethyl ethylenimine (2-(2-hydroxyethyl)aziridine), aminoethyl ethylenimine (2-(2-aminoethyl)aziridine), 3-chloropropyl ethylenimine (2-(3-chloropropyl) aziridine), p-chlorophenyl ethylenimine (2-(4-chlorophenyl)aziridine), methoxyethyl ethylenimine (2-(2-methoxyethyl) aziridine), dodecyl aziridinyl formate (dodecyl 1-aziridinyl carboxylate), carbethoxyethyl ethylenimine (2-(2-carbethoxyethyl)aziridine).

Because of their availability and because they have been found to be among the most effective, the preferred aziridines are ethylenimine, 1,2-propylenimine and 2-ethylaziridine.

The suitable aziridines are usually reacted with acrylates.

Preferred acrylates are polyacrylates having a functionality f≧2, which can be synthesized e.g. by an esterification reaction between a polyol and acrylic acid. However, other methods are also possible to synthesize those polyfunctional acrylates. Examples of polyols used in this kind of polyacrylate synthesis include neopentyl glycol, 2,2'-bis(p-hydroxyphenyl)propane (bis-phenol A), bis(p-hydroxyphenyl)methane (bis-phenol F), glycerol, trimethylolpropane, pentaerythritol and others. It is also possible to use diols commonly used in polyester synthesis. Examples of these diols include ethylene and propylene glycol, butandiol, hexanediol and others.

It is also possible but less preferred to react the monomeric aziridine with monoacylates e.g. esters of acrylic and methacrylic acid and subsequently perform an optionally base catalyzed transesterification reaction.

The reaction temperature in the Michael-addition between the acrylate and the aziridine is above the melting point of the components and below 100° C. Reactions at room temperature will usually work well. It is preferred to react between 0 and 60° C., more preferred between 25 and 50° C. Theoretically higher temperatures can be applied, but are not preferred. It is also possible to run the reaction under pressure with or without elevated temperatures, if suitable equipment is available, which is less preferred. Typically the monomeric aziridine is added to the acrylate over a period of time to control the exothermic reaction. The reaction is then performed in the above mentioned temperature range. Typically the reaction time is less then 24 hours, but will vary with batch size. It is also possible to add the acrylate to the monomeric aziridine, however this is less preferred. In either case, at the end of the reaction the monomeric aziridine level is usually less than 1000 ppm, for example in the range between 100 ppm and 1000 ppm. In cases where the monomeric aziridine level is significantly higher it is possible to apply a weak vacuum (around 50 mm Hg) and use a distillation column to reduce the monomeric aziridine level into the above mentioned range. However, to further reduce the monomeric aziridine content sophisticated vacuum equipment or very long application times are necessary.

To reduce the level of monomeric aziridine to below 10 ppm according to one embodiment of the invention an excess of a suitable organic carbonate scavenger is added to the reaction mixture, wherein the excess is based on the equivalent ratio of scavenger to monomeric aziridine. The invention uses an equivalent ratio of scavenger to residual monomeric aziridine of 1:1 to 30:1, preferably 3:1 to 10:1. If the residual amount in the polyaziridine forming reaction mixture is between 200 and 1000 ppm, usually 0.01 and 2% by wt of the scavenger, based on the reaction mixture is sufficient. Preferred amounts of scavenger are between 0.05 and 1.5% by wt., more preferred between 0.1 and 1.0% by wt., and most preferred between 0.15 and 0.6% by wt, based on the weight of the reaction mixture.

The monomeric aziridine-scavenger-reaction can be performed at ambient temperature. Since the reaction is exothermic a means for constantly cooling the reaction can be optionally employed.

The scavenger is generally added slowly into the reactor containing the polyaziridine forming reaction mixture. The reactor is usually equipped with a condenser, a stirring means and a temperature measuring device. If the acrylate in this reaction is a polyacrylate then the reaction is finished, however, if the acrylate is a monoacrylate a transesterification reaction can be performed afterwards. In this less preferred case it is possible to perform the Michael-reaction first, then the transesterification reaction and finally the scavenging reaction.

Scavengers are compounds that react fast with aziridines. Several classes of compounds fit this description. In the context of the invention it is also desirable that the resulting mixtures of the polyaziridine and the reaction product of the aziridine and the scavenger are useful for coatings applications in that they have appropriate properties including color stability and rheological stability. Additionally, suitable scavengers in the context of the present invention do not release acidic by-products. Examples of suitable scavengers include organic carbonates.

Suitable organic carbonates include organic carbonates according to the formula

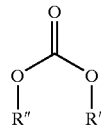

wherein

R' and R" independently represent alkyl with up to about 20 carbon atoms, aryl, alkaryl, or aralkyl, R' and R" together with the two oxygen atoms and the carbon atom can form a heterocyclic ring.

Preferred residues R' and R" include methyl, ethyl, propyl, phenyl, tolyl, xylyl, benzyl or phenethyl.

Suitable organic carbonates include dimethylcarbonate, diethylcarbonate, dipropylcarbonate, dibutylcarbonate, dipentylcarbonate, and higher homolog or branched dialkylcarbonates such as diisopropylcarbonate or diisobutylcarbonate, as well as dicycloalkyl carbonates and alkyl-cycloalkylcarbonates such as dicyclohexylcarbonate or ethyl-cyclohexylcarbonate, alkyl-aryl carbonates such as ethyl-phenylcarbonate, and diarylcarbonates and cyclic carbonates such as 1,3-dioxolan-2-one and 4-methyl-1,3-dioxolan-2-one.

It is preferred that the organic carbonate has a carbonate functionality ≦2, more preferred ≦1.5 and most preferred ≦1, however molecules having a carbonate functionality >2 might also be used, if they are soluble in the polyaziridines and if their reactivity towards monoaziridines allows the reaction with aziridines according to the invention.

Substituted organic carbonates can also be used provided that the substituents are not positioned to render the organic carbonate group unreactive and do not act as nucleophiles and open the aziridine rings or cause polymerization or self polymerization of aziridine rings.

It is also possible to use a mixture of organic carbonates. However, preferred carbonates are cyclic carbonates, most preferred is 4-methyl-1,3-dioxolane-2-one.

It can be useful to add a stabilizer to the reaction mixture. It is preferred to use tertiary amines, more preferred the use of aliphatic tertiary amines and especially preferred is the use of tetramethylethylene diamine (TMEDA). Other additives e.g. antioxidants, rheology modifier, light stabilizer among others can be added as necessary for the final application, if they are not nucleophilic or acidic in nature.

It is possible to add the stabilizer to the reaction mixture before, during or after the reaction.

The scavenger can be added with or preferred without solvent or solvent mixtures, however preferred solvents are non-nucleophilic and non-acidic in nature. In general, it is preferred to add the scavenger or the mixture of scavengers neat without solvent.

Catalysts that enhance the reactivity of the scavenger are usually not necessary. Preferred catalysts are non-nucleophilic and non-acidic in nature.

The products prepared by the present invention can be used in all known polyaziridine applications, including use as cross-linkers, in adhesive applications, in coating compositions and in inks and printing compositions, in the field of photography, thermal and electrostatic imaging, fiber and fabric treatment and other uses.

The invention is further illustrated but is not intended to be limited by the following examples in which all parts and percentages are by weight unless otherwise specified.

EXAMPLES

Production of Polyaziridine (I)

4800 lbs trimethylolpropane triacrylate were charged to a reactor and 17 lbs 4-methoxyphenol were added as an inhibitor against free radical polymerization. 2 lbs triethylamine were added to the reactor to maintain basic conditions.

An excess of 10% molar excess of propylene imine (2-methylaziridine) was then added slowly over 10–12 hours, while keeping reaction temperature at 35–40° C.

After all of the propylene imine was added, the temperature was maintained around 37.5° C. for about 9 hours. Some propylene imine was removed by distillation at about 50 mm Hg for 7 hours.

The polyaziridine product contained about 270 ppm of residual propylene imine.

The examples below were compared by mixing at room temperature 0.5 grams or less of the scavengers listed with 100 grams of polyaziridine (I). The resulting products were clear, slightly viscous liquids.

This dramatically lowered the PI content from about 270 ppm to less than 10 ppm. The modified polyaziridine was unaffected in terms of physical properties and application properties.

| Example | Scavenger | Scavenger Weight Grams | Initial PI (ppm) LC-MS | Final PI (ppm) LC-MS | Appearance |
|---|---|---|---|---|---|
| 1 | Propylene Carbonate | 0.50 | 214 | <1 | clear |
| Comp 1 | Benzoyl chloride | 0.50 | 214 | 4 | hazy |
| Comp 2 | Phthalic anyhyride | 0.50 | 214 | n.d. | did not dissolve |

The examples also show that not all possible scavengers result in resins that are commercially usable, but that the scavenger according to the invention has an excellent result.

Physical Property Comparison

The physical properties, such as viscosity, density, color and solubility of the composition according to the invention, were comparable to the unscavenged composition.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for reducing the monomeric aziridine content in a polyaziridine forming reaction mixture comprising aziridines and acrylates, the process comprising adding to the polyaziridine forming reaction mixture an excess of an organic carbonate scavenger according to the formula

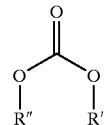

R' and R" independently represent alkyl, aryl, alkaryl, or aralkyl group containing up to about 20 carbon atoms where optionally, R' and R" together with the two oxygen atoms and the carbon atom in the carbonate group can form a heterocyclic ring, and wherein when a heterocyclic ring is formed the organic carbonate scavenger is 1,3-dioxolan-2-one or 4-methyl-1,3-dioxolan-2-one, and wherein the excess is based on the equivalent ratio of organic carbonate scavenger to monomeric aziridine.

2. The process of claim 1, wherein the equivalent ratio of the organic carbonate scavenger to monomeric aziridine is between 30:1 to 1.01:1.

3. The process of claim 1, wherein the equivalent ratio of the organic carbonate scavenger to monomeric aziridine is between 10:1 and 3:1.

4. The process of claim 1 wherein the polyaziridine forming reaction mixture has a content of monomeric aziridine between 100 ppm and 1000 ppm.

5. The process of claim 4 comprising adding between 0.05 and 1.5% by weight of the organic carbonate scavenger based on the polyaziridine forming reaction mixture.

6. The process of claim 4 comprising adding between 0.1 and 1.0% by weight of the organic carbonate scavenger.

7. The process of claim 4 comprising adding between 0.15 and 0.6% by weight of the organic carbonate scavenger.

8. The process of claim 1 comprising reacting an acrylate component and an aziridine component to form the polyaziridine forming reaction mixture.

9. The process of claim 8 comprising reacting an acrylate component and an aziridine component before adding the organic carbonate scavenger.

10. The process of claim 8 comprising adding a stabilizer to the reaction mixture before, during or after the reaction.

11. The process of claim 10 wherein the stabilizer comprises a tertiary amine.

12. The process of claim 10 wherein the stabilizer is tetramethylethylene diamine.

13. The process of claim 8 comprising reacting the components at a temperature above the melting point of the aziridine compound and below 100° C.

14. The process of claim 1 comprising adding between 0.05 and 1.5% by weight of the organic carbonate scavenger based on the polyaziridine forming reaction mixture.

15. The process of claim 1 wherein the organic carbonate scavenger comprises an organic carbonate with a carbonate functionality of $\leq 1$.

16. The process of claim 1 wherein the organic carbonate scavenger comprises diethylcarbonate.

17. The process of claim 1 wherein the organic carbonate scavenger is selected from the group consisting of dimethylcarbonate, diethylcarbonate, dipropylcarbonate, dibutylcarbonate, dipentylcarbonate, diisopropylcarbonate, diisobutylcarbonate, dicyclohexylcarbonate, ethylcyclohexylcarbonate, ethyl-phenylcarbonate, 1,3-dioxolan-2-one and 4methyl-1,3-dioxolan-2one.

* * * * *